United States Patent
Shettigar et al.

(10) Patent No.: US 12,179,869 B2
(45) Date of Patent: Dec. 31, 2024

(54) PORTABLE LOCK APPARATUS

(71) Applicant: Schlage Lock Company LLC, Carmel, IN (US)

(72) Inventors: Ramamohan Bhaskar Shettigar, Thane (IN); Marco Stunnebrink, Horssen (NL); Arjun S. Kunnath, Kattayam (IN)

(73) Assignee: Schlage Lock Company LLC, Carmel, IN (US)

( * ) Notice: Subject to any disclaimer, the term of this patent is extended or adjusted under 35 U.S.C. 154(b) by 259 days.

(21) Appl. No.: 17/951,773

(22) Filed: Sep. 23, 2022

(65) Prior Publication Data
US 2024/0101205 A1    Mar. 28, 2024

(51) Int. Cl.
| | |
|---|---|
| *E05B 71/00* | (2006.01) |
| *B62H 5/14* | (2006.01) |
| *E05B 47/06* | (2006.01) |
| *E05B 67/00* | (2006.01) |

(52) U.S. Cl.
CPC ......... *B62H 5/147* (2013.01); *E05B 47/0603* (2013.01); *E05B 67/003* (2013.01); *E05B 71/00* (2013.01)

(58) Field of Classification Search
CPC ... B62H 5/147; E05B 47/0603; E05B 67/003; B60R 25/00; B60R 25/09; B60R 25/093; Y10T 70/40; Y10T 70/409; Y10T 70/411; Y10T 70/5836; Y10T 70/5841; Y10T 70/5845
USPC ..................................... 70/14, 18, 19, 30, 49
See application file for complete search history.

(56) References Cited

U.S. PATENT DOCUMENTS

| | | | |
|---|---|---|---|
| 2,855,028 A | 10/1958 | Matthews | |
| 2,921,353 A | 1/1960 | Cushman | |
| 4,028,916 A * | 6/1977 | Pender | E05B 67/003 70/49 |
| 4,543,806 A | 10/1985 | Papandrea et al. | |
| 4,571,965 A * | 2/1986 | LeRoux | B62H 5/145 70/227 |
| 4,635,782 A | 1/1987 | Wieth et al. | |
| 4,819,464 A * | 4/1989 | Kuo | B62H 5/003 70/49 |
| 5,197,310 A | 3/1993 | Pedersen | |
| 5,706,679 A * | 1/1998 | Zane | E05B 67/003 70/49 |

(Continued)

FOREIGN PATENT DOCUMENTS

| | | |
|---|---|---|
| CN | 108691459 A | 10/2018 |
| DE | 69001894 T2 | 11/1993 |

(Continued)

*Primary Examiner* — Suzanne L Barrett
(74) *Attorney, Agent, or Firm* — Taft Stettinius & Hollister LLP (57) ABSTRACT

An exemplary security apparatus generally includes a tether, a head, and a body. The head is secured to the tether, and generally includes a plug including a latch and an actuator at least selectively operable to move the latch from a latching position to an unlatching position. The body is secured to the tether, and includes a port operable to receive the plug. With the plug received in the port, the latch prevents separation of the head and the body when the latch is in the latching position, and does not prevent separation of the head and the body when the latch is in the unlatching position.

22 Claims, 10 Drawing Sheets

(56) References Cited

U.S. PATENT DOCUMENTS

| | | | | |
|---|---|---|---|---|
| 5,937,678 | A * | 8/1999 | Kuo | B62H 5/003 70/49 |
| 6,578,394 | B2 * | 6/2003 | Yin | E05B 73/0005 70/49 |
| 6,742,366 | B1 * | 6/2004 | Lai | E05B 67/003 70/30 |
| 7,131,298 | B1 * | 11/2006 | Haraughty | E05B 67/003 70/30 |
| 7,661,280 | B1 * | 2/2010 | Weyland | B62H 5/003 70/30 |
| 8,151,604 | B2 * | 4/2012 | Thomas | E05B 67/365 70/386 |
| 8,297,086 | B2 * | 10/2012 | Yu | E05B 67/003 70/30 |
| 8,528,370 | B2 * | 9/2013 | Yu | E05B 67/003 70/49 |
| 8,528,371 | B2 * | 9/2013 | Spiegel | E05B 67/003 70/65 |
| 8,578,743 | B2 * | 11/2013 | Yu | E05B 73/0082 70/53 |
| 8,752,407 | B2 * | 6/2014 | Taiga | E05B 67/003 70/52 |
| 8,854,207 | B2 | 10/2014 | Williams | |
| 9,512,649 | B2 | 12/2016 | Mohamed | |
| 9,669,888 | B1 | 6/2017 | Singleton | |
| 9,976,321 | B2 | 5/2018 | Chen | |
| 2005/0262904 | A1 * | 12/2005 | Ling | E05B 67/003 70/49 |
| 2013/0174616 | A1 * | 7/2013 | Allen, Jr. | A01K 27/001 119/793 |
| 2014/0060126 | A1 * | 3/2014 | Stevens | E05B 67/36 70/35 |
| 2016/0024818 | A1 * | 1/2016 | Allen | E05B 37/0068 70/53 |
| 2018/0112439 | A1 * | 4/2018 | Darakdjian | E05B 73/0005 |
| 2020/0361552 | A1 | 11/2020 | Radenbaugh et al. | |
| 2023/0008382 | A1 * | 1/2023 | Townsend | E05B 37/0058 |
| 2024/0101205 | A1 * | 3/2024 | Shettigar | E05B 73/0005 |
| 2024/0102317 | A1 * | 3/2024 | Stunnebrink | E05B 67/22 |

FOREIGN PATENT DOCUMENTS

| | | | |
|---|---|---|---|
| DE | 3543201 C2 | 1/1995 | |
| DE | 10240558 B4 | 4/2010 | |
| DE | 10240570 B4 | 4/2010 | |
| DE | 102010008054 A1 | 8/2011 | |
| DE | 102012102896 A1 | 10/2013 | |
| DE | 202015104232 U1 | 9/2015 | |
| DE | 202015104618 U1 | 10/2015 | |
| DE | 202015105949 U1 | 12/2015 | |
| DE | 202016101782 U1 | 6/2016 | |
| DE | 102018006576 A1 | 2/2020 | |
| DE | 202020106957 U1 | 1/2021 | |
| EP | 728659 B1 | 5/1999 | |
| EP | 1418302 B1 | 8/2005 | |
| EP | 1834864 A1 | 9/2007 | |
| EP | 1416110 B1 | 5/2008 | |
| EP | 1717135 B1 | 2/2009 | |
| EP | 2842847 B1 | 10/2015 | |
| EP | 2962919 A1 | 1/2016 | |
| EP | 2962920 A1 | 1/2016 | |
| EP | 2842846 B1 | 4/2016 | |
| EP | 3064419 B1 | 6/2018 | |
| EP | 3566933 A1 | 11/2019 | |
| NL | 2000149 C2 | 1/2008 | |
| NL | 2022574 B1 | 8/2020 | |
| WO | WO-2009158326 A2 * | 12/2009 | B62H 5/003 |
| WO | 2014089919 A1 | 6/2014 | |
| WO | 2021038059 A1 | 3/2021 | |

* cited by examiner

PORTABLE LOCK APPARATUS

TECHNICAL FIELD

The present disclosure generally relates to portable lock apparatuses, and more particularly but not exclusively relates to ring locks including secondary locking features.

BACKGROUND

Portable lock apparatuses are often used to discourage theft of transportation devices, such as bicycles and motorcycles. As one example, certain existing portable lock apparatuses involve the use of a ring lock and a tether operable to engage the ring lock and to be retained in engagement with the ring lock by a lock mechanism of the ring lock. However, some existing ring locks face certain challenges and limitations, such as those relating to ensuring that the transportation device remains secured when the lock mechanism of the ring lock is defeated. For these reasons among others, there remains a need for further improvements in this technological field.

SUMMARY

An exemplary security apparatus generally includes a tether, a head, and a body. The head is secured to the tether, and generally includes a plug including a latch and an actuator at least selectively operable to move the latch from a latching position to an unlatching position. The body is secured to the tether, and includes a port operable to receive the plug. With the plug received in the port, the latch prevents separation of the head and the body when the latch is in the latching position, and does not prevent separation of the head and the body when the latch is in the unlatching position. Further embodiments, forms, features, and aspects of the present application shall become apparent from the description and figures provided herewith.

DETAILED DESCRIPTION OF ILLUSTRATIVE EMBODIMENTS

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

Figure 1:
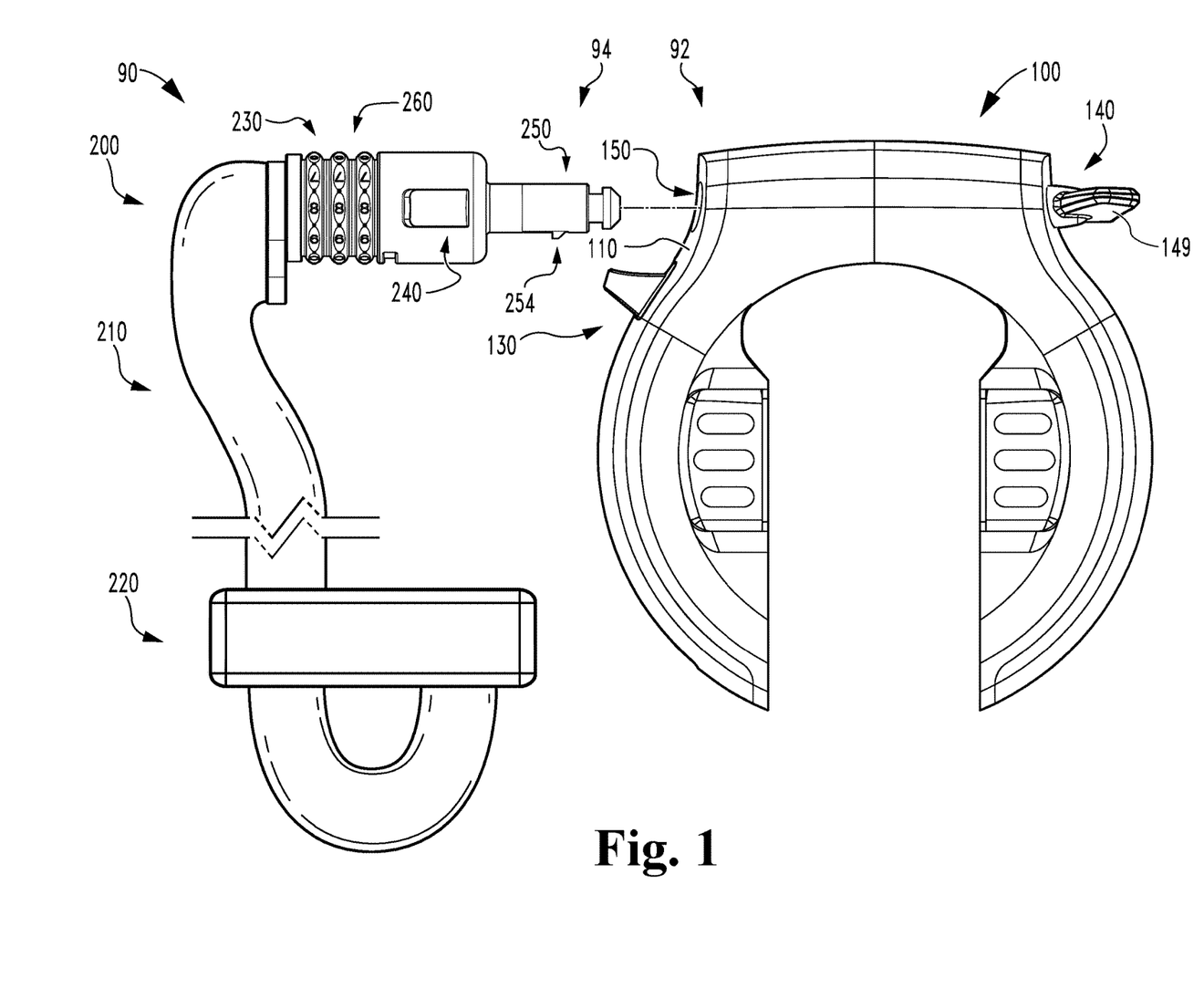
FIG. 1 illustrates a security system according to certain embodiments.

With reference to FIG. 1, illustrated therein is a system 90 according to certain embodiments. The system 90 generally includes a portable lock apparatus 92 and an additional security device 94. In the illustrated form, the portable lock apparatus 92 is provided in the form of a ring lock 100 according to certain embodiments, and the security device 94 is provided in the form of a security tether 200 according to certain embodiments. As described herein, it is also contemplated that the portable lock apparatus 92 and/or the security device 94 may take another form. For example, the portable lock apparatus 92 may be provided in another form, such as that of a U-lock, a padlock, or another form of portable lock apparatus. Additionally or alternatively, the security device 94 may instead be provided along the lines of the security tether 300 illustrated in FIG. 14, or the security tether 400 illustrated in FIG. 15.

Figure 2:
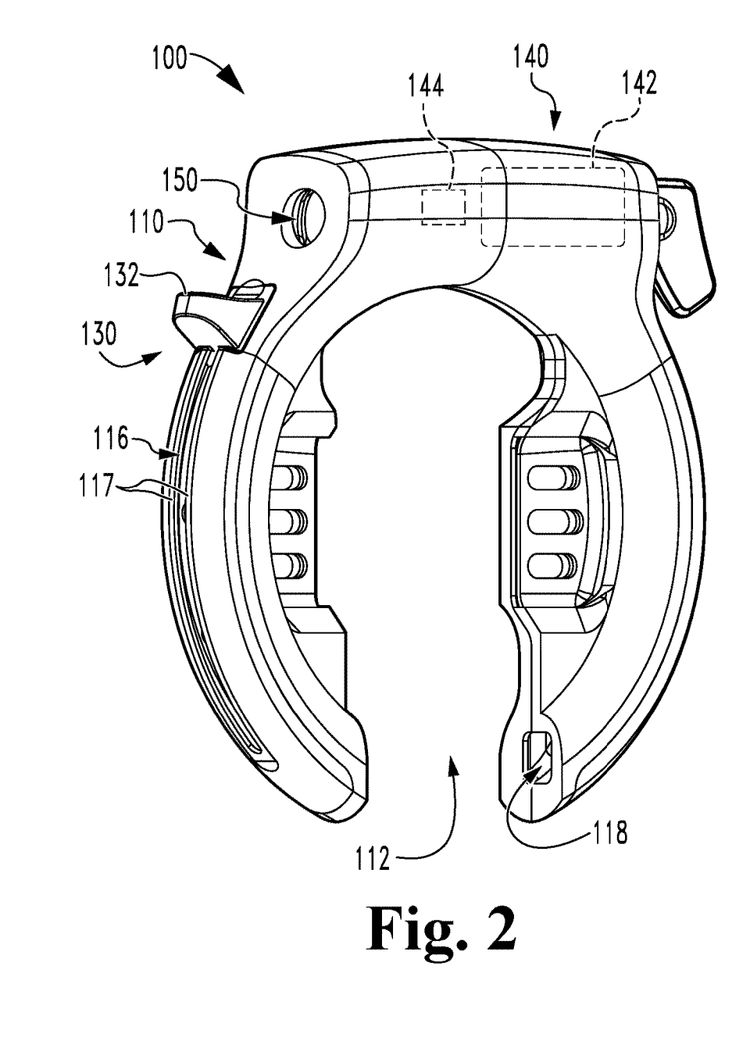
FIG. 2 is a perspective view of a ring lock according to certain embodiments while in an open condition.
Figure 3:
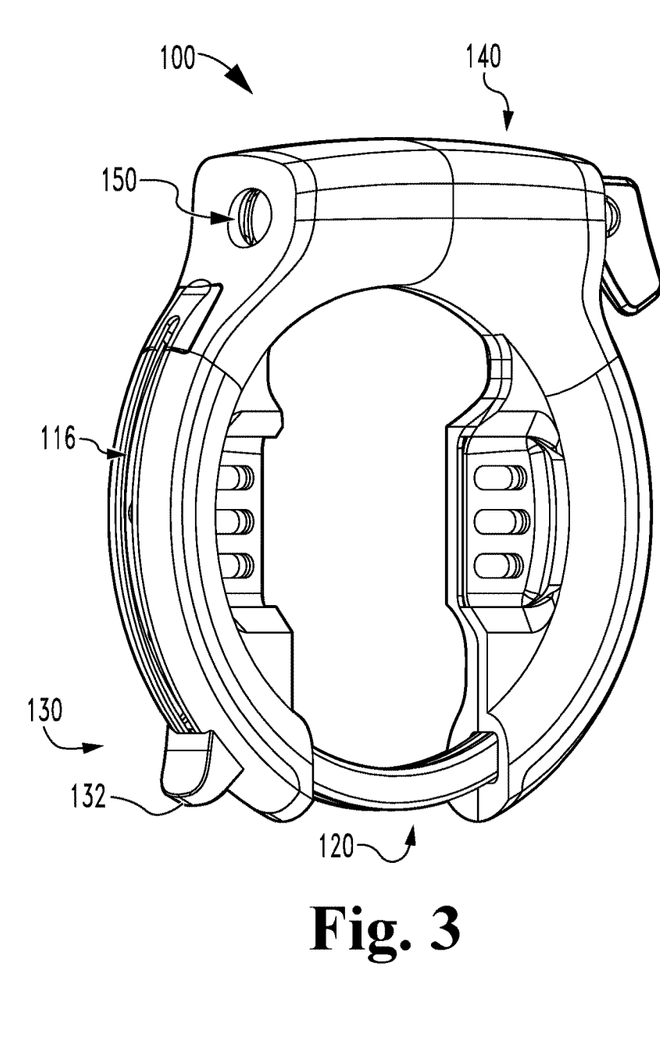
FIG. 3 is a perspective view of the ring lock illustrated in FIG. 2 while in a closed condition.

With additional reference to FIGS. 2 and 3, illustrated therein is a ring lock 100 that may, for example, be utilized as the portable lock apparatus 92 of the system 90. The ring lock 100 generally includes a housing 110, a shackle 120 movably mounted in the housing 110, a driver 130 operable to move the shackle 120 between an open position (FIG. 2) and a closed positon (FIG. 3), a lock mechanism 140 operable to selectively retain the shackle 120 in the closed position, and a port 150. As described herein, the port 150 facilitates coupling of the ring lock 100 with an additional security apparatus, such as a security tether.

The housing 110 encloses one or more other components of the ring lock 100, and provides a base to which one or more components of the ring lock 100 may be mounted. In the illustrated form, the housing 110 is configured for mounting to a wheeled transportation device (e.g., a bicycle or motorcycle) adjacent a wheel of the transportation device, and includes a gap 112 operable to receive a portion of the wheel of the transportation device. The illustrated housing 110 defines an arcuate guide path 116 along which a portion of the driver 130 travels during opening and closing of the ring lock 100. Positioned on opposite sides of the guide path 116 are a pair of lips 117 that facilitate the guiding of the driver 130 along the guide path 116.

Figure 4:
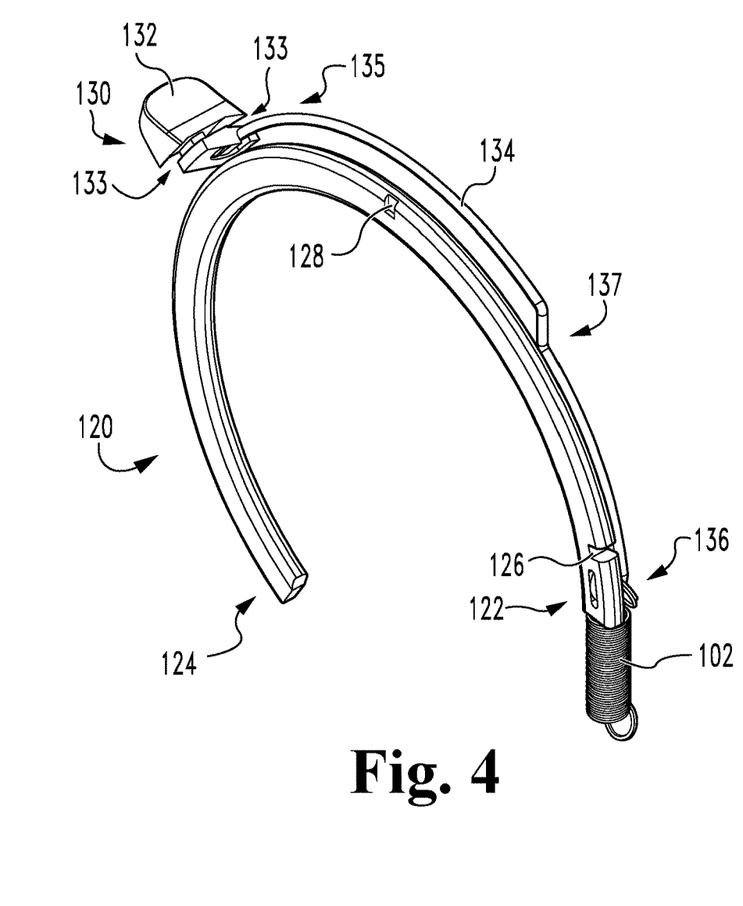
FIG. 4 is a perspective view of a portion of the ring lock illustrated in FIG. 2, the illustrated portion including a shackle and an actuator.

With additional reference to FIG. 4, the shackle 120 is generally arcuate, and is mounted for movement relative to the housing 110 between an open position and a closed position. The shackle 120 includes a rear end portion 122 that remains within the housing 110, and a front end portion 124 that crosses the gap 112 and enters an opening 118 of the housing 110 during closing of the shackle 120. With the shackle 120 in the closed position, a portion of the wheel of the transportation device may be captured within the enclosed opening 112 such that the shackle 120 interferes with spokes of the wheel to prevent rotation of the wheel relative to the frame. When the shackle 120 is in its open position, the shackle 120 is received in the housing 110, and the wheel is free to rotate. The shackle 120 includes a closed position notch 126 operable to be engaged by the lock mechanism 140 when the shackle 120 is in its closed position to thereby retain the shackle 120 in its closed position. In the illustrated form, the shackle 120 further includes an open position notch 128 operable to be engaged by the lock mechanism 140 when the shackle 120 is in its open position to thereby retain the shackle 120 in its open position. The shackle 120 may be biased toward its open position, for example by a spring 102 connected between the shackle 120 and the housing 110.

The driver 130 is connected with the shackle 120, and facilitates manual manipulation of the shackle 120 between its open position and its closed position. The driver 130 generally includes a knob 132 mounted for movement along the arcuate path 116, and a rigid connector 134 extending between the knob 132 and the rear end portion 122 of the shackle 120. The knob 132 includes a pair of channels 133 that receive the lips 117 and thereby restrict the knob 132 to movement along the guide path 116. The connector 134 is generally arcuate, and includes a first end portion 135 that is coupled with the knob 132 and a second end portion 136 that is coupled with the rear end portion 122 of the shackle 120. In certain embodiments, the connector 134 may include a bend 137. The connector 134 extends through an aperture in the housing 110 such that a slit in the internal case is not required for coupling the knob 132 with the shackle 120.

The lock mechanism 140 is configured to selectively retain the shackle 120 in its closed position, and may further be operable to retain the shackle 120 in its open position. The lock mechanism 140 includes a lock core 142 and a bolt 144 operable to selectively engage the shackle 120. More particularly, the bolt 144 is operable to engage the closed position notch 126 when the shackle 120 is in its closed position, and may further be operable to engage the open position notch 128 when the shackle 120 is in its open position. The lock core 142 is operable to selectively retain the bolt 144 in an extended position in which the bolt 144 engages one of the notches 126, 128 of the shackle 120. The lock mechanism 140 has a locked state in which the lock mechanism 140 prevents movement of the shackle 120, and an unlocked state in which the lock mechanism 140 does not prevent movement of the shackle 120.

In certain forms, the lock core 142 may be provided in the form of a mechanical core. For example, the lock core 142 may include a lock cylinder operable by a key 149 and/or a mechanical combination lock. Additionally or alternatively, the lock core 142 may include electronic features that facilitate the transition of the lock mechanism 140 between its locked and unlocked states. For example, the lock core 142 may include a credential reader and/or a wireless communication device operable to communicate with an external device. A credential reader may, by way of illustration, include a biometric credential reader operable to read biometric credentials, a card reader operable to read a credential embodied in tangible form, and/or a keypad operable to receive credential input. A wireless communication device may, for example, be configured to communicate with an external device via Bluetooth (e.g., Bluetooth Low Energy), WiFi, Zigbee, and/or another wireless communication protocol. In certain embodiments, the lock mechanism 140 may be provided in the form of an Internet-of-Things (IoT) device.

Figure 5:
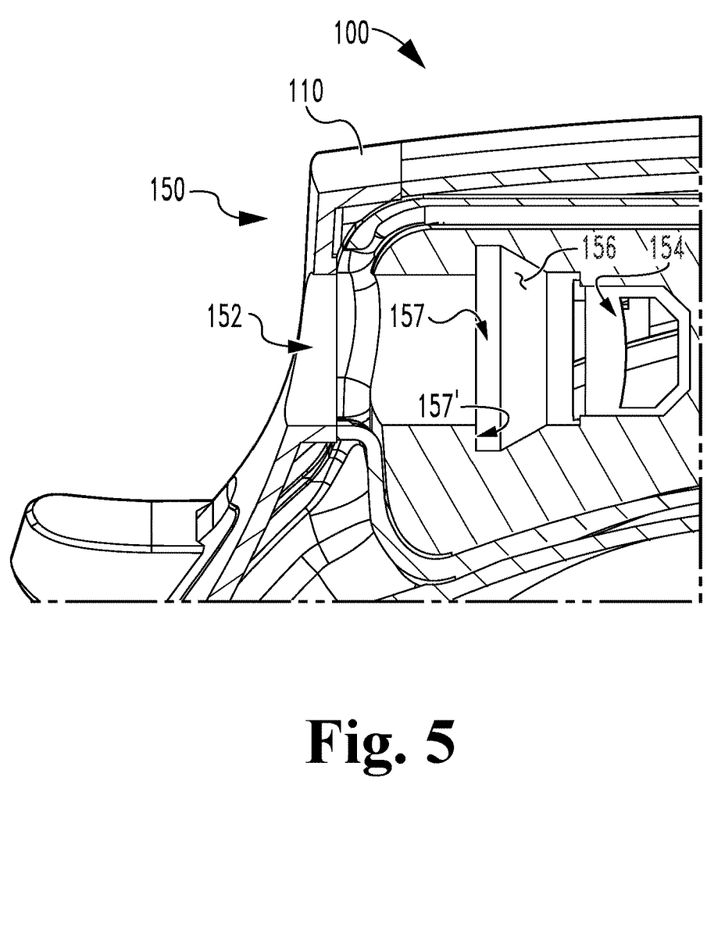
FIG. 5 is a cross-sectional view of a port of the ring lock illustrated in FIG. 2.

With additional reference to FIG. 5, the port 150 generally includes an entry or outer portion 152, an inner portion 154, and an engagement portion 156 positioned between the outer portion 152 and the inner portion 154. The engagement portion 156 includes a recess 157 that is defined at least in part by a shoulder 157' operable to engage a latch 254 of a plug 250 of the security tether 200 as described herein. In the illustrated form, the port 150 has a generally circular cross-section, and the recess 157 is generally annular. As described herein, such a configuration may facilitate coupling of the security tether 200 with the ring lock 100 and/or may facilitate rotation of the inserted plug 250. It is also contemplated that the port 150 may have a non-circular cross-section, and that the recess 157 may be non-annular.

Figure 6:
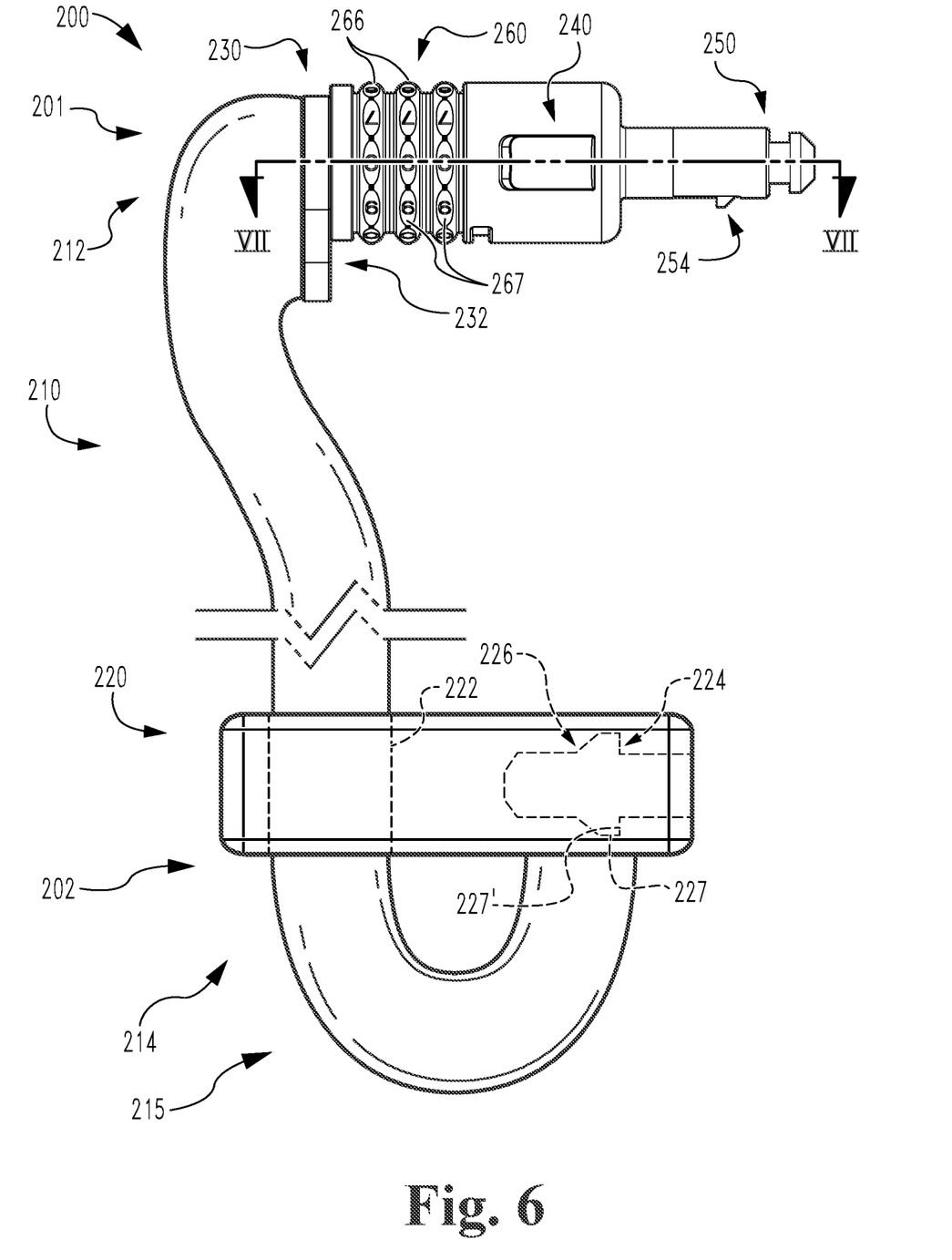
FIG. 6 illustrates a security tether according to certain embodiments.

With additional reference to FIG. 6, the security tether 200 generally includes a tether 210 and a head 230 secured to the tether 210, and may further include a body 220 secured to the tether 210. As described herein, the head 230 generally includes an actuator 240 and a plug 250, and may further include a lock mechanism 260. As described herein, the plug 250 includes a latch 254, and the actuator 240 is at least selectively operable to move the latch 254 from a latching position to an unlatching position. In embodiments that include the lock mechanism 260, the lock mechanism 260 may selectively prevent the actuator 240 from moving the latch 254 to the unlatching position.

The tether 210 is generally flexible, and has a first end portion 212 and an opposite second end portion 214. The tether 210 may, for example, include one or more of a chain, a rope, a cable, folding links, and/or another form of tether. The head 230 is secured to the first end portion 212, and the body 220 may be secured to the second end portion 214. In the illustrated form, a portion of the tether 210 passes through an opening 222 in the body 220 such that the second end portion 214 defines a loop 215. It is also contemplated that the loop 215 may be omitted.

In the illustrated form, the body 220 is secured to the second end portion 214 of the tether 210, and is operable to engage the head 230 such that the security tether 200 is capable of closing on itself to form a closed loop. To facilitate such engagement, the body 220 includes a port 224 operable to receive the plug 250 and to engage with a latch 254 of the plug 250 to thereby selectively prevent separation of body 220 and the head 230. The port 224 is substantially similar to the above-described port 150, and includes an engagement portion 226 including a recess 227 that is defined at least in part by a shoulder 227'. As described herein, the shoulder 227' is operable to engage a latch 254 of the plug 250 to thereby selectively prevent separation of the body 220 and the head 230.

The head 230 is secured to the first end portion 212 of the tether 210, and is operable to engage the ring lock 100 as described herein. The head 230 generally includes a base 232 secured to the first end portion 212 of the tether 210, an actuator 240, and a plug 250, and may further include a lock mechanism 260.

As should be evident from the foregoing, the illustrated security tether 200 has a first end portion 201 and a second end portion 202. The first end portion 201 includes the head 230, and the second end portion 202 includes the loop 215 and the body 220. Stated another way, the first end portion 201 may include a plug 250 configured to be received in the port 150, the plug 250 may include a latch 254, and the second end portion 202 may include a loop 215 and a body 220 defining a second port 226 sized and shaped to receive the plug 250. As described herein with reference to FIG. 12, the system 90 in certain embodiments has a configuration in which a portion of the security tether 200 passes through the loop 215, the plug 250 is received in the first port 150, and the latch 254 selectively prevents removal of the plug 250 from the first port 150. As described herein with reference to FIG. 13, the system 90 may have a configuration in which the plug 250 is received in the second port 226 and the latch 254 selectively prevents removal of the plug 250 from the second port 226.

Figure 7:
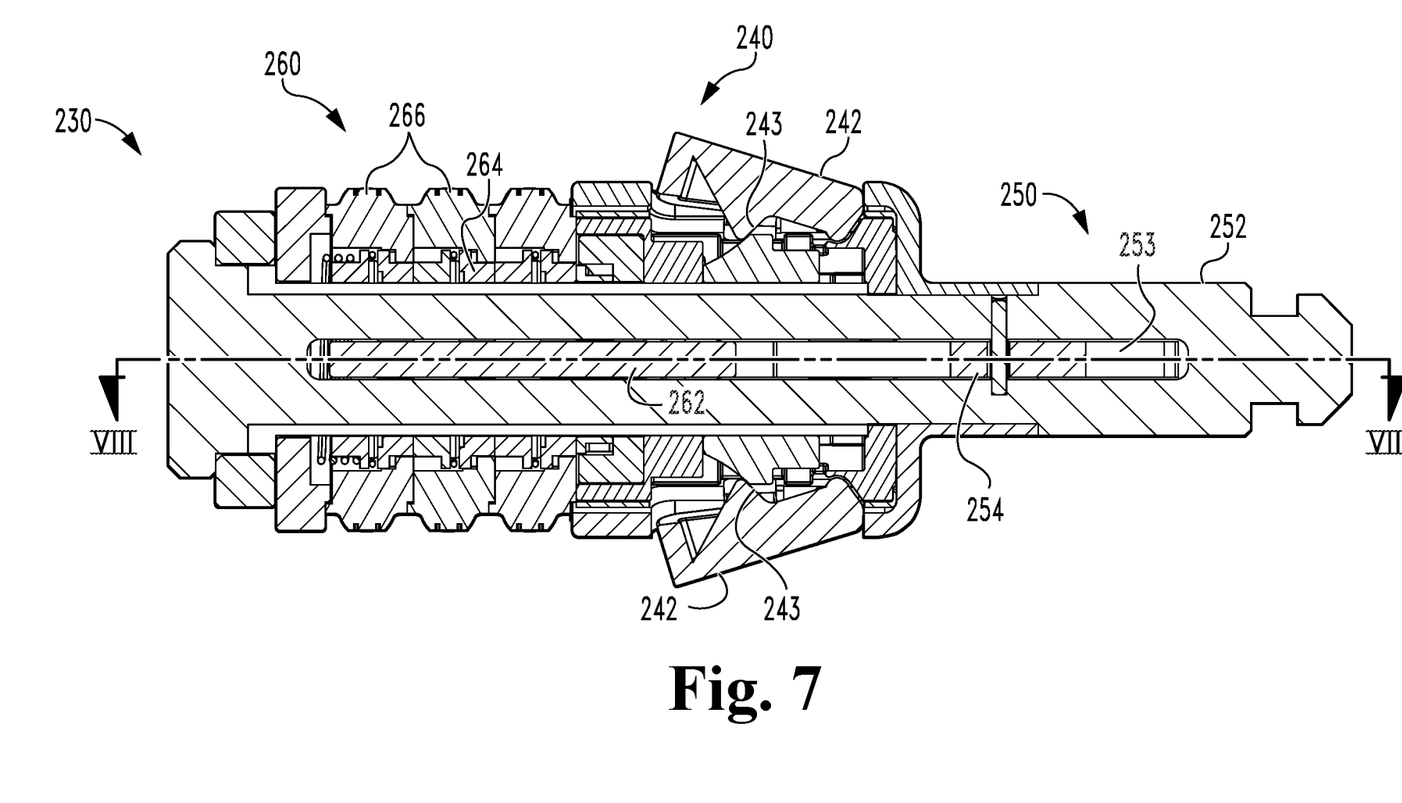
FIG. 7 is a first cross-sectional illustration of a head of the security tether illustrated in FIG. 6, and is taken along the line VII-VII shown in FIG. 6.

With additional reference to FIG. 7, the actuator 240 is at least selectively operable to move the latch 254 from its latching position to its unlatching position. The actuator 240 is selectively operable to move the latch 254 to its unlatching position, and may be selectively prevented from moving the latch 254 to its unlatching position by the lock mechanism 260. The illustrated actuator 240 includes at least one trigger 242, and in the illustrated form includes a pair of triggers 242 positioned opposite one another. As described herein, when the actuator 240 is operable to actuate the latch 254, depression of the trigger(s) 242 causes the actuator 240 to drive the latch 254 to its unlatching position.

Figure 8:
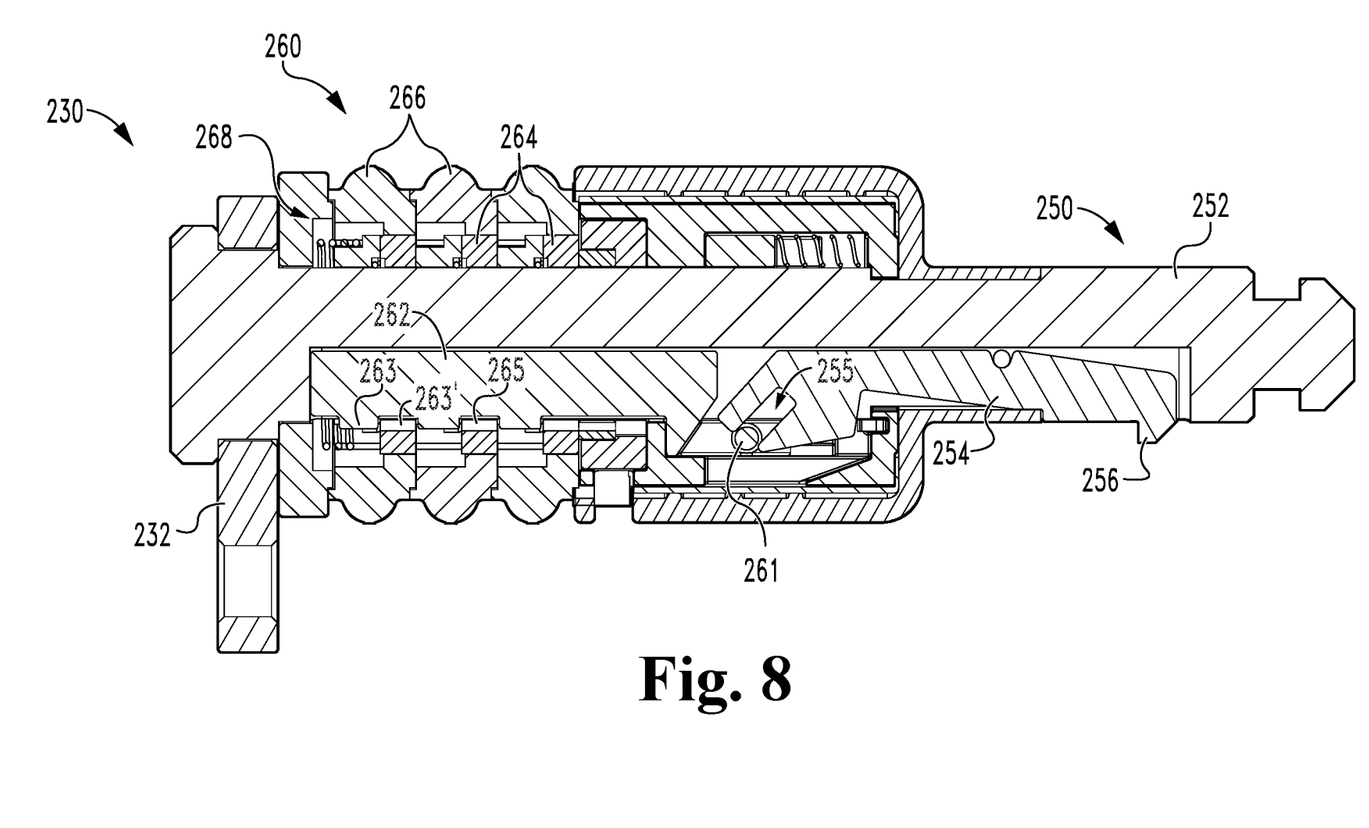
FIG. 8 is a second cross-sectional illustration of the head illustrated in FIG. 7, is taken along the line VIII-VIII shown in FIG. 7, and illustrates the head in a coupling state.
Figure 9:
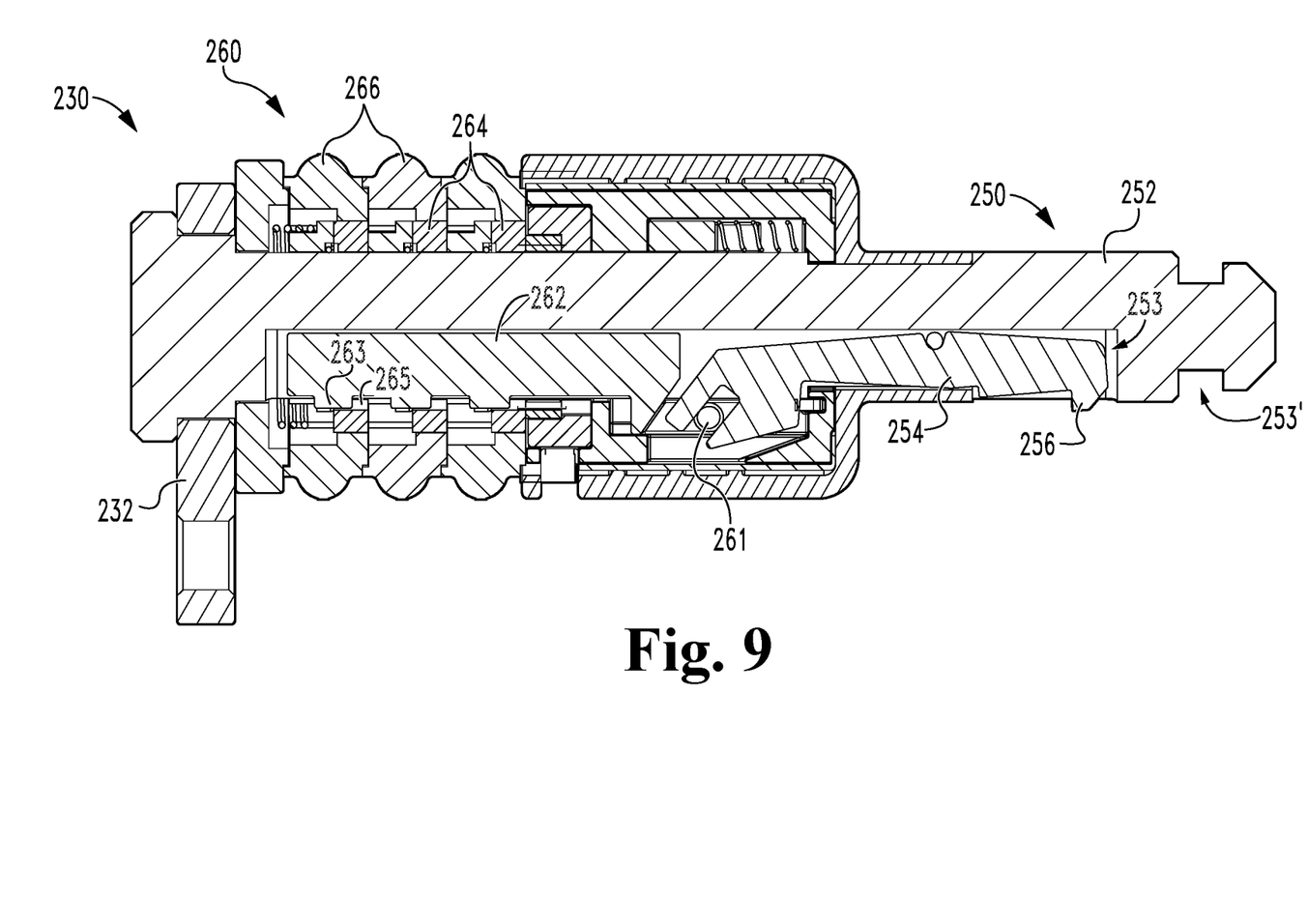
FIG. 9 is a third cross-sectional illustration of the head illustrated in FIG. 7, is taken along the line VIII-VIII shown in FIG. 7, and illustrates the head in a decoupling state.

With additional reference to FIGS. 8 and 9, the plug 250 is sized and shaped to be received in each of the ports 150, 224, and generally includes a post 252 and the latch 254. In the illustrated form, the post 252 includes a channel 253 in which the latch 254 is movably seated. An inner end of the latch 254 includes a ramp slot 255, and an opposite end of the latch 254 includes a tang 256. The ramp slot 255 receives a pin 261 that is coupled to a spindle 262 of the lock mechanism 260 such that movement of the spindle 262 from a proximal home position to a distal shifted position pivots the latch 254 from its latching position (FIG. 8) to its unlatching position (FIG. 9). As described herein, such pivoting of the latch 254 facilitates coupling and decoupling of the plug 250 with each of the ports 150, 224.

The lock mechanism 260 generally includes a spindle 262, a plurality of inner dials 264 positioned about the spindle 262, and a plurality of outer dials 266 positioned about the inner dials 264. The spindle 262 is selectively axially movable between a proximal home position (FIG. 8) and a distal shifted position (FIG. 9). The spindle 262 is connected with the pin 261 that is engaged with the ramp slot 255 such that shifting of the spindle 262 between its home position and its shifted position causes a corresponding pivoting of the latch 254 between its latching position and its unlatching position. The spindle 262 includes a plurality of splines 263, which are separated from one another by gaps 263'. Each inner dial 264 includes a corresponding gate 265 operable to receive a respective one of the splines 263. Each outer dial 266 includes a plurality of indicia 267, and is selectively engaged with a corresponding one of the inner dials 266 such that the outer dial 266 is operable to rotate the corresponding inner dial 264. As described herein, the lock mechanism 260 can be moved between a locked condition and an unlocked condition by entering the appropriate code via the outer dials 266.

In the illustrated form, the lock mechanism 260 includes three outer dials 266. It is also contemplated that the lock mechanism 260 may include more or fewer outer dials 266. In such forms, the lock mechanism 260 may include a corresponding number of inner dials 264, and the spindle 262 may include a corresponding number of splines 263 and gaps 263'. Moreover, while the illustrated indicia 267 are provided as numerical digits zero through nine, it is also contemplated that each outer dial 266 may include more or fewer indicia 267, and that such indicia 267 may be provided in another form. By way of example, one or more outer dials 266 may include indicia 267 in the form of numbers, letters, symbols, colors, and/or other indicia.

As noted above, the lock mechanism 260 has a locked condition and an unlocked condition. In the locked condition, at least one of the outer dials 266 is in an incorrect position, causing the gate 265 of the corresponding inner dial 264 to be misaligned with the respective spline 263. As a result, the misaligned inner dial 264 retains the spindle 262 in its home position, and the latch 254 is retained in its latching position.

With the lock mechanism 260 in the unlocked condition, each spline 263 is aligned with a gate 265 of a corresponding inner dial 264 such that the spindle 262 is able to move distally to its shifted position. Such movement of the spindle 262 may be brought about by actuation of the actuator 240, such as by depression of one or both of the triggers 242. Depression of at least one trigger 242 causes a ramp 243 of the trigger 242 to engage a corresponding ramp of the spindle 262 to thereby drive the spindle 262 toward its shifted position. Movement of the spindle 262 toward its shifted position causes the pin 261 to ride along the ramp slot 255, thereby moving the latch 254 to its unlatching position.

As will be appreciated, the lock mechanism 260 may include a reset mechanism 268 by which the code for the lock mechanism 260 can be changed. When the proper code is entered and the lock mechanism 260 is in its unlocked condition, the reset mechanism 268 may be actuated (e.g., by hand or by a tool) to drive the inner dials 264 out of engagement with the outer dials 266. With the dials 264, 266 disengaged with one another, the outer dials 266 may be rotated relative to the inner dials 264 to input a new combination. When the new combination is entered, the reset mechanism 268 may be deactuated to thereby return the inner dials 264 to engagement with the outer dials 266. With the inner dials 264 once again engaged with the outer dials 266, the combination for the lock mechanism 260 is reset, and can be entered to move the lock mechanism 260 to its unlocked condition.

Figure 10:
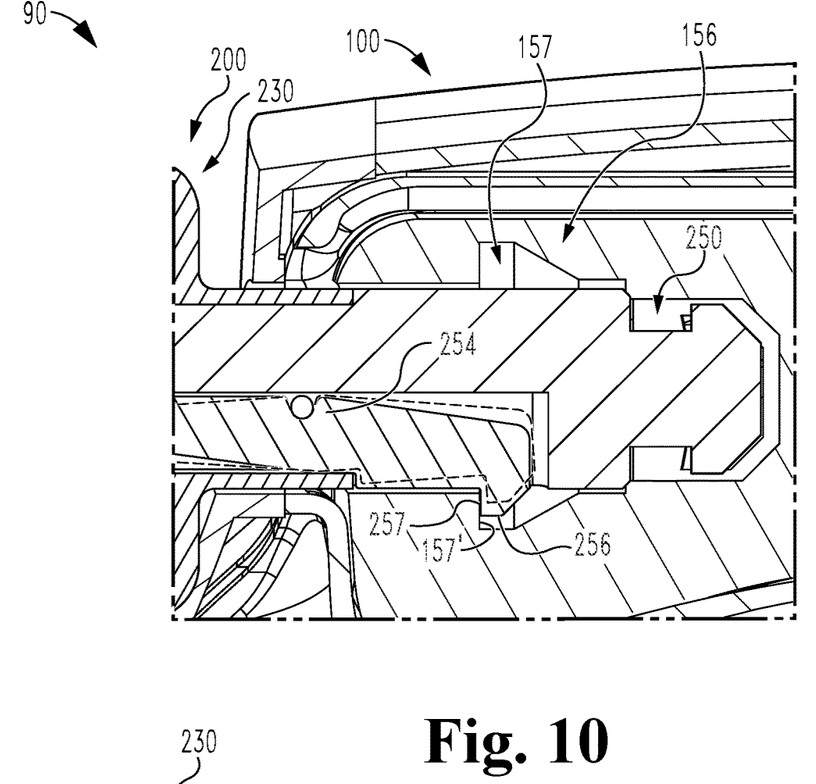
FIG. 10 is a cross-sectional view of the head illustrated in FIG. 7 while engaged with the port illustrated in FIG. 5.

With additional reference to FIG. 10, the head 230 is operable to selectively couple with the ring lock 100 via engagement of the plug 250 with the port 150. As noted above, the port 150 is sized and shaped to receive the plug 250, and includes an engagement section 156 operable to engage the latch 254. When the latch 254 is in its latching position (illustrated in solid), the tang 256 enters the recess 157 such that a shoulder 257 of the tang 256 is aligned with the shoulder 157' of the recess 157. In this state, the latch 254 prevents separation of the head 230 from the ring lock 100. When the lock mechanism 260 is moved to its unlocked condition and the actuator 240 is actuated, the latch 254 moves to its unlatching position (illustrated in phantom) as described above, thereby permitting removal of the plug 250 from the port 150 and separation of the head 230 from the ring lock 100.

As should be appreciated from the foregoing, in the illustrated form, the coupling of the plug 250 with the port 150 is independent of the locked/unlocked state of the lock mechanism 140. Stated another way, the lock mechanism 140 is inoperable to retain the plug 250 in engagement with the port 150, and the plug 250 is operable to remain coupled with the port 150 and to decouple from the port 150 both when the lock mechanism 140 is locked and when the lock mechanism 140 is unlocked. It is also contemplated that the lock mechanism 140 may be operable to selectively prevent removal of the plug 250 from the port 150. By way of example, an additional latch may selectively engage a recess 253' of the post 252, and the position of such an additional latch may be controlled by the lock mechanism 140.

Figure 11:
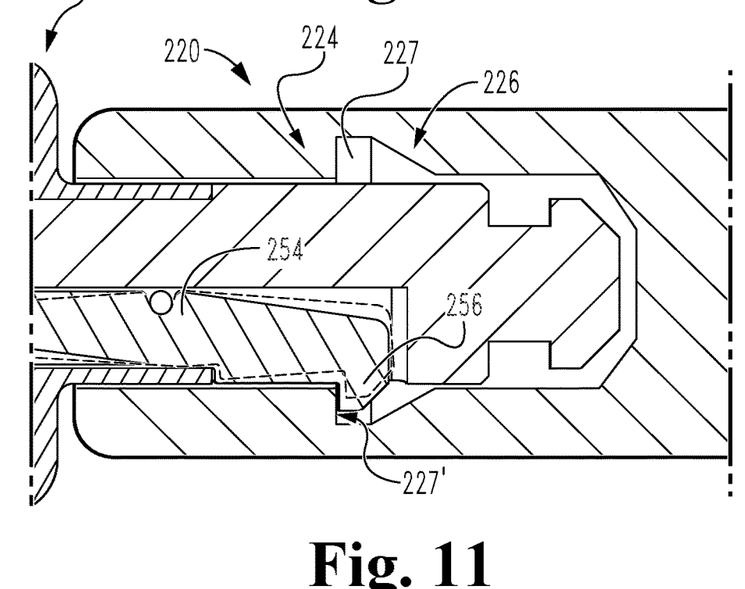
FIG. 11 is a cross-sectional view of the head illustrated in FIG. 7 while engaged with a port of a body of the security tether.

With additional reference to FIG. 11, in certain embodiments, the head 230 is also operable to selectively couple with the body 220 via engagement of the port 224 with the plug 250. As noted above, the port 224 is sized and shaped to receive the plug 250, and includes an engagement section 226 operable to engage the latch 254. When the latch 254 is in its latching position (illustrated in solid), the tang 256 enters the recess 227 such that a shoulder 257 of the tang 256 is aligned with the shoulder 227' of the recess 157. In this state, the latch 254 prevents separation of the head 230 from the body 220. When the lock mechanism 260 is moved to its unlocked condition and the actuator 240 is actuated, the latch 254 moves to its unlatching position (illustrated in phantom) as described above. With the latch 254 in its unlatching position, the tang 256 disengages from the engagement section 156, and the latch shoulder 257 clears the recess shoulder 157', thereby permitting removal of the plug 250 from the port 224 and separation of the head 230 from the body 220.

Figure 12:
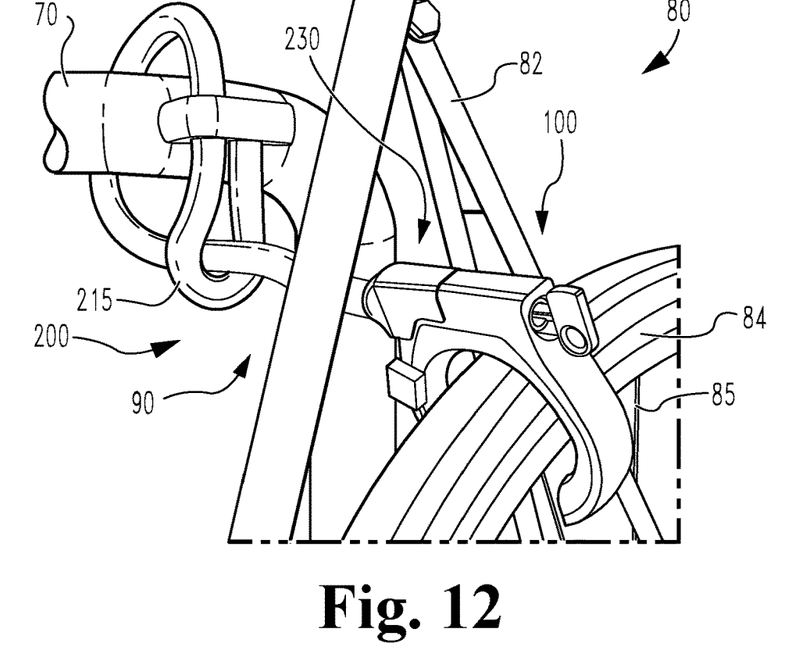
FIG. 12 illustrates the system depicted in FIG. 1 in a first example use case scenario.

With additional reference to FIG. 12, illustrated therein is a first example use case scenario for the security tether 200. In the first scenario, the ring lock 100 is mounted to a wheeled transportation device such as a bicycle 80, and the security tether 200 is coupled with the ring lock 100. More particularly, the ring lock 100 is mounted to the frame 82 of the bicycle 80 adjacent a wheel 84 of the bicycle 80, and the head 230 is engaged with the ring lock 100 along the lines described above. A portion of the wheel 84 is received within the recess 112 such that the ring lock 100 is operable to selectively prevent rotation of the wheel 84. When the shackle 120 is in its open position, the wheel 84 is free to rotate as normal. However, when the shackle 120 is in its closed position, the shackle 120 interferes with spokes 85 of the wheel 84, thereby preventing rotation of the wheel 84 relative to the frame.

In the first scenario, the bicycle 80 is also secured to a stationary object such as a bike rack 70 via the security tether 200. More particularly, the tether 210 has been wrapped about a portion of the bike rack 70, and the head 230 has been passed through the loop 215 and engaged with the port 150 of the ring lock 100. As a result, the bicycle 80 is not only prevented from its normal mode of travel by the ring lock 100, but is also prevented from being carried away by the security tether 200.

Figure 13:
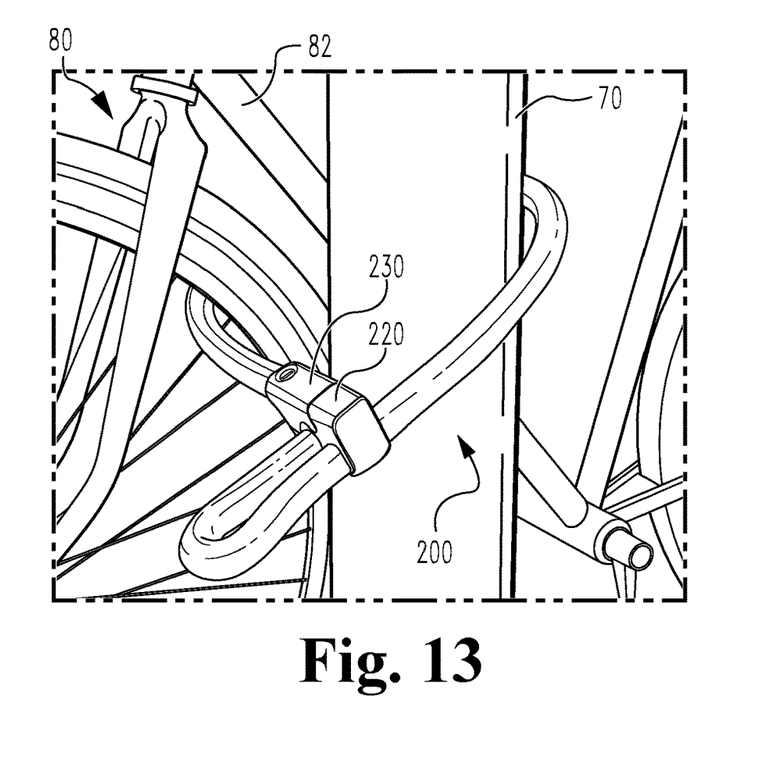
FIG. 13 illustrates the system depicted in FIG. 1 in a second example use case scenario.

With additional reference to FIG. 13, illustrated therein is a second example use case scenario for the security tether 200. In this scenario, the security tether 200 is used independently of the ring lock 100, which may be omitted. The security tether 200 has been wrapped around a portion of the bicycle 80 and a portion of the rack 70, and the head 230 has been engaged with the body 220 along the lines described above. As a result, the security tether 200 may serve to secure the bicycle 80 to the rack 70 even in the absence of the ring lock 100.

In the above-described embodiment of a security tether 200, the security tether 200 includes lock mechanism 260 in the form of a mechanical combination lock mechanism. It is also contemplated that the lock mechanism 260 may be provided in another form. By way of example, the lock mechanism 260 may instead be provided in the form of a key-operable lock cylinder, for example as described below with reference to FIG. 14. In certain embodiments, the lock mechanism 260 may include electronic features, such as a credential reader and/or a wireless communication device. A credential reader may, by way of illustration, include a biometric credential reader operable to read biometric credentials, a card reader operable to read a credential embodied in tangible form, and/or a keypad operable to receive credential input. A wireless communication device may, for example, be configured to communicate with an external device via Bluetooth (e.g., Bluetooth Low Energy), WiFi, Zigbee, and/or another wireless communication protocol. In certain embodiments, the lock mechanism 260 may be provided in the form of an Internet-of-Things (IoT) device. In certain embodiments, the lock mechanism 260 may be omitted, for example as described below with reference to FIG. 15.

Figure 14:
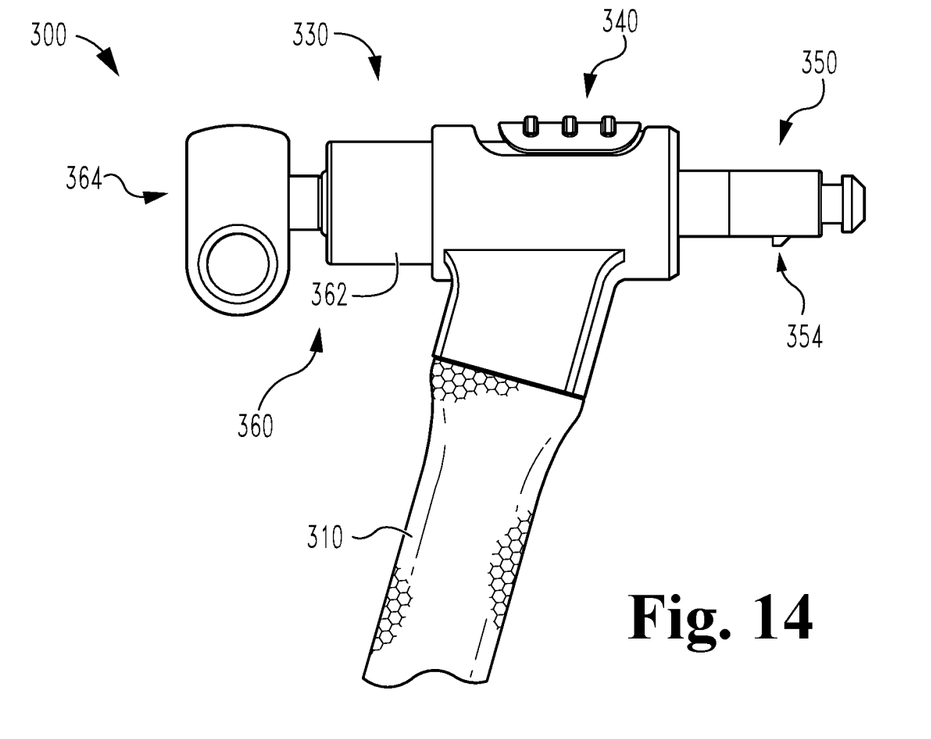
FIG. 14 illustrates a portion of a security tether according to certain embodiments.

With additional reference to FIG. 14, illustrated therein is a security tether 300 according to certain embodiments. The security tether 300 may, for example, be utilized as the security device 94 in place of the above-described security tether 200. The security tether 300 is substantially similar to the security tether 200, and similar reference characters are used to indicate similar elements and features. For example, the security tether 300 includes a tether 310, a head 330, an actuator 340, a plug 350, and a lock mechanism 360, which respectively correspond to the above-described tether 210, head 230, actuator 240, plug 250, and lock mechanism 260. In certain embodiments, the security tether 300 may further include a loop and/or a body corresponding to the loop 215 and the body 220. In the interest of conciseness, the following description of the security tether 300 focuses primarily on elements and features that are different from those described above with reference to the security tether 200.

As with the above-described security tether 200, the security tether 300 includes an actuator 340 and a lock mechanism 360 operable to selectively prevent the actuator 340 from moving the latch to its unlatching position. In the illustrated form, however, the actuator 340 is provided in the form of a slider 342, and the lock mechanism 360 includes a lock cylinder 362 that is operable by a key 364. When the proper key 364 is inserted and rotated, the slider 342 can be manually moved from a home position to a shifted position to thereby move the latch 354 from its latching position to its unlatching position. As will be appreciated, the security tether 300 is operable to be utilized in a use case scenario corresponding to the use case scenario described above with reference to FIG. 12. In embodiments in which the security tether 300 includes a body along the lines of the above-described body 220, the security tether 300 may further be operable to be utilized in a use case scenario corresponding to the use case scenario described above with reference to FIG. 13.

Figure 15:
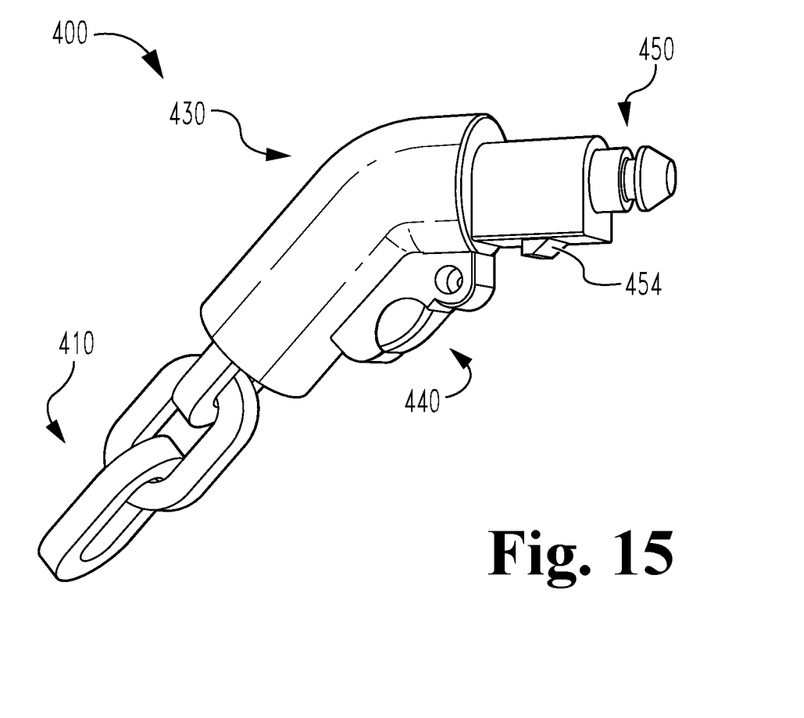
FIG. 15 illustrates a portion of a security tether according to certain embodiments.

With additional reference to FIG. 15, illustrated therein is a security tether 400 according to certain embodiments. The security tether 400 may, for example, be utilized as the security device 94 in place of the above-described security tether 200. The security tether 400 is substantially similar to the security tether 200, and similar reference characters are used to indicate similar elements and features. For example, the security tether 400 includes a tether 410, a head 430, an actuator 440, and a plug 450, which respectively correspond to the above-described tether 210, head 230, actuator 240, and plug 250. In certain embodiments, the security tether 400 may further include a loop and/or a body corresponding to the loop 215 and the body 220. In the interest of conciseness, the following description of the security tether 400 focuses primarily on elements and features that are different from those described above with reference to the security tether 200.

In the illustrated form, the security tether 400 lacks a lock mechanism corresponding to the lock mechanism 260. As a result, the actuator 440 is at all times operable to move the latch 454 between its latching position and its unlatching position. While the tether 410 of the illustrated embodiment is provided in the form of a chain, it is also contemplated that the tether 410 may be provided in another form, such as that of a cable, rope, or other form of tether. As will be appreciated, the security tether 400 is operable to be utilized in a use case scenario corresponding to the use case scenario described above with reference to FIG. 12. In embodiments in which the security tether 400 includes a body along the lines of the above-described body 220, the security tether 400 may further be operable to be utilized in a use case scenario corresponding to the use case scenario described above with reference to FIG. 13.

It should be appreciated from the foregoing that at least some embodiments of the subject matter described herein may provide for additional security as compared to conventional ring lock systems. In many such conventional systems, a security tether may be selectively coupled to the ring lock by the same lock mechanism that selectively retains the shackle in the closed position. In such conventional systems, defeating the lock mechanism allows the attacker to both move the shackle to the open position (thereby defeating the immobilization capability) and to remove the tether (thereby enabling the attacker to remove the bicycle or other transportation device from the stationary object to which it was secured by the tether).

In contrast to the above-described limitations of conventional ring lock systems, at least certain embodiments described herein provide for a second security stage that prevents theft of the device being secured even in the event that the lock mechanism 140 of the ring lock 100 is defeated. More particularly, in embodiments in which the security tether includes its own lock mechanism, such a lock mechanism may prevent removal of the security tether from the ring lock even in the event that the lock mechanism 140 is defeated.

Moreover, it should be appreciated that at least some embodiments of the subject matter described herein facilitate use of a security system in multiple configurations. For example, the security system 90 may be utilized in a first configuration corresponding to the use case scenario described in connection with FIG. 12, and a second configuration corresponding to the use case scenario described in connection with FIG. 13. Such adaptability for different configurations may provide the user with additional options for securing a portable object to a stationary object, and may further facilitate the use of a security tether in combination with a portable lock apparatus and/or as a standalone security device.

Certain embodiments of the present application relate to a system, comprising: a portable lock apparatus comprising a first port and a first lock mechanism operable to selectively retain the portable lock apparatus in a closed condition; and a security apparatus, comprising: a tether; and a head secured to the tether, wherein the head comprises: a plug configured to be received in the first port, the plug comprising a latch having a latching position and an unlatching position; and an actuator at least selectively operable to move the latch from the latching position to the unlatching position; wherein, with the plug received in the first port, the latch in the latching position prevents removal of the plug from the first port; and wherein, with the plug received in the first port, the latch in the unlatching position does not prevent removal of the plug from the first port.

In certain embodiments, the head further comprises a second lock mechanism; and wherein the second lock mechanism is operable to selectively prevent the actuator from moving the latch from the latching position to the unlatching position.

In certain embodiments, the second lock mechanism comprises a combination lock mechanism.

In certain embodiments, the second lock mechanism comprises a key-operable lock mechanism.

In certain embodiments, the security apparatus further comprises a body secured to the tether; wherein the body comprises a second port operable to receive the plug; wherein, with the plug received in the second port, the latch in the latching position prevents removal of the plug from the second port; and wherein, with the plug received in the second port, the latch in the unlatching position does not prevent removal of the plug from the second port.

In certain embodiments, the body retains a portion of the tether in a loop.

In certain embodiments, the tether further comprises a loop.

Certain embodiments of the present application relate to a security apparatus, comprising: a tether; a head secured to the tether, the head comprising: a plug comprising a latch; and an actuator at least selectively operable to move the latch from a latching position to an unlatching position; and a body secured to the tether, the body comprising a port operable to receive the plug; wherein, with the plug received in the port, the latch prevents separation of the head and the body when the latch is in the latching position; and wherein, with the plug received in the port, the latch does not prevent separation of the head and the body when the latch is in the unlatching position.

In certain embodiments, the head further comprises a lock mechanism operable to selectively prevent the actuator from moving the latch from the latching position to the unlatching position.

In certain embodiments, the lock mechanism comprises at least one of a combination lock mechanism or a key-operable lock mechanism.

In certain embodiments, the security apparatus further comprises a loop defined at least in part by the tether; and wherein the loop is sized and shaped to permit passage of the head through the loop.

In certain embodiments, the loop is defined in part by the body.

In certain embodiments, a portion of the tether passes through an opening in the body and an end of the tether is secured to the body such that the security apparatus defines a loop.

Certain embodiments of the subject application relate to a system comprising the security apparatus, the system further comprising a portable lock apparatus; wherein the portable lock apparatus comprises an additional port and a lock mechanism operable to selectively retain the portable lock apparatus in a closed condition; wherein, with the plug received in the additional port, the latch prevents separation of the head and the portable lock apparatus when the latch is in the latching position; and wherein, with the plug received in the port, the latch does not prevent separation of the head and the portable lock apparatus when the latch is in the unlatching position.

Certain embodiments of the present application relate to a system, comprising: a portable lock apparatus comprising a first port and a first lock mechanism operable to selectively retain the portable lock apparatus in a closed condition; and a security tether comprising: a first end portion including a plug configured to be received in the first port, wherein the plug comprises a latch; and a second end portion comprising a loop and a body defining a second port sized and shaped to receive the plug; wherein the system has a first configuration in which a portion of the security tether passes through the loop, the plug is received in the first port, and the latch selectively prevents removal of the plug from the first port; and wherein the system has a second configuration in which the plug is received in the second port and the latch selectively prevents removal of the plug from the second port.

In certain embodiments, the security tether further comprises an actuator; and wherein the actuator is at least selectively operable to move the latch from a latching position to an unlatching position.

In certain embodiments, the actuator is at all times operable to move the latch from the latching position to the unlatching position.

In certain embodiments, the security tether further comprises a second lock mechanism; and wherein the second lock mechanism operable to selectively prevent the actuator from moving the latch from the latching position to the unlatching position.

In certain embodiments, the portable lock apparatus is a ring lock.

In certain embodiments, coupling of the plug with the first port is independent of a locked/unlocked state of the first lock mechanism.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
a portable lock apparatus comprising a first port and a first lock mechanism operable to selectively retain the portable lock apparatus in a closed condition; and
a security apparatus, comprising:
a tether; and
a head secured to the tether, wherein the head comprises:
a plug configured to be received in the first port, the plug comprising a latch having a latching position and an unlatching position; and
an actuator at least selectively operable to move the latch from the latching position to the unlatching position;
wherein, with the plug received in the first port, the latch in the latching position prevents removal of the plug from the first port; and
wherein, with the plug received in the first port, the latch in the unlatching position does not prevent removal of the plug from the first port.

2. The system of claim 1, wherein the head further comprises a second lock mechanism; and
wherein the second lock mechanism is operable to selectively prevent the actuator from moving the latch from the latching position to the unlatching position.

3. The system of claim 2, wherein the second lock mechanism comprises a combination lock mechanism.

4. The system of claim 2, wherein the second lock mechanism comprises a key-operable lock mechanism.

5. The system of claim 1, wherein the security apparatus further comprises a body secured to the tether;

wherein the body comprises a second port operable to receive the plug;

wherein, with the plug received in the second port, the latch in the latching position prevents removal of the plug from the second port; and wherein, with the plug received in the second port, the latch in the unlatching position does not prevent removal of the plug from the second port.

6. The system of claim 5, wherein the body retains a portion of the tether in a loop.

7. The system of claim 1, wherein the tether further comprises a loop.

8. A security apparatus, comprising:
a tether;
a head secured to the tether, the head comprising:
 a plug comprising a latch that is movable between a latching position and an unlatching position; and
 an actuator at least selectively operable to move the latch from the latching position to the unlatching position; and
a body secured to the tether, the body comprising a port operable to receive the plug;
wherein, with the plug received in the port, the latch prevents separation of the head and the body when the latch is in the latching position; and
wherein, with the plug received in the port, the latch does not prevent separation of the head and the body when the latch is in the unlatching position.

9. A security apparatus, comprising:
a tether;
a head secured to the tether, the head comprising:
 a plug comprising a latch; and
 an actuator at least selectively operable to move the latch from a latching position to an unlatching position; and
a body secured to the tether, the body comprising a port operable to receive the plug;
wherein, with the plug received in the port, the latch prevents separation of the head and the body when the latch is in the latching position;
wherein, with the plug received in the port, the latch does not prevent separation of the head and the body when the latch is in the unlatching position; and
wherein the head further comprises a lock mechanism operable to selectively prevent the actuator from moving the latch from the latching position to the unlatching position.

10. The security apparatus of claim 9, wherein the lock mechanism comprises at least one of a combination lock mechanism or a key-operable lock mechanism.

11. The security apparatus of claim 8, further comprising a loop defined at least in part by the tether;
wherein the loop is sized and shaped to permit passage of the head through the loop.

12. The security apparatus of claim 11, wherein the loop is defined in part by the body.

13. The security apparatus of claim 8, wherein a portion of the tether passes through an opening in the body and an end of the tether is secured to the body such that the security apparatus defines a loop.

14. A system comprising the security apparatus of claim 8, the system further comprising a portable lock apparatus;
wherein the portable lock apparatus comprises an additional port and a lock mechanism operable to selectively retain the portable lock apparatus in a closed condition;
wherein, with the plug received in the additional port, the latch prevents separation of the head and the portable lock apparatus when the latch is in the latching position; and
wherein, with the plug received in the port, the latch does not prevent separation of the head and the portable lock apparatus when the latch is in the unlatching position.

15. A system, comprising:
a portable lock apparatus comprising a first port and a first lock mechanism operable to selectively retain the portable lock apparatus in a closed condition; and
a security tether comprising:
 a first end portion including a plug configured to be received in the first port, wherein the plug comprises a latch; and
 a second end portion comprising a loop and a body defining a second port sized and shaped to receive the plug;
wherein the system has a first configuration in which a portion of the security tether passes through the loop, the plug is received in the first port, and the latch selectively prevents removal of the plug from the first port; and
wherein the system has a second configuration in which the plug is received in the second port and the latch selectively prevents removal of the plug from the second port.

16. The system of claim 15, wherein the security tether further comprises an actuator; and
wherein the actuator is at least selectively operable to move the latch from a latching position to an unlatching position.

17. The system of claim 16, wherein the actuator is at all times operable to move the latch from the latching position to the unlatching position.

18. The system of claim 16, wherein the security tether further comprises a second lock mechanism; and
wherein the second lock mechanism operable to selectively prevent the actuator from moving the latch from the latching position to the unlatching position.

19. The system of claim 15, wherein the portable lock apparatus is a ring lock.

20. The system of claim 15, wherein coupling of the plug with the first port is independent of a locked/unlocked state of the first lock mechanism.

21. The system of claim 15, wherein the plug comprising a post that is sized and shaped for receipt within the port of the body; and
wherein the latch moves relative to the post between the latching position and the unlatching position.

22. The system of claim 15, wherein the latch pivots between the latching position and the unlatching position.

* * * * *